Dec. 25, 1945. J. WASEM 2,391,809
PEDAL DRIVE
Filed Aug. 5, 1943
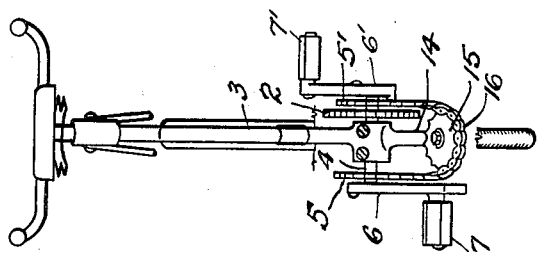
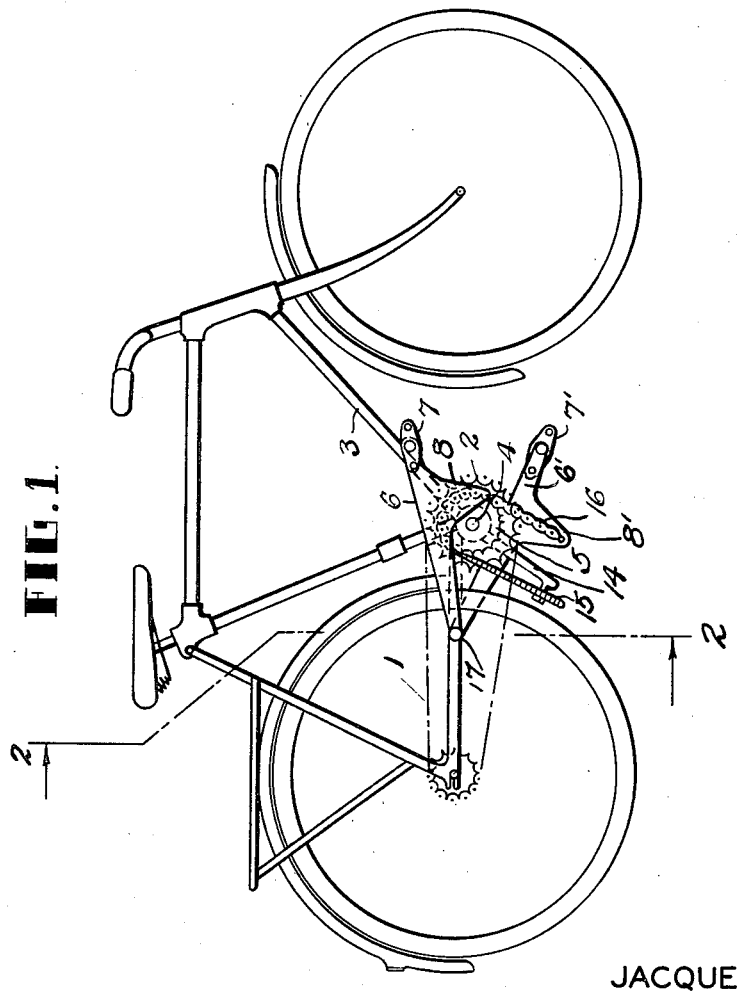
Inventor
JACQUES WASEM
By [signature]
Attorney Patented Dec. 25, 1945

2,391,809

UNITED STATES PATENT OFFICE 2,391,809

PEDAL DRIVE

Jacques Wasem, Veyrier, Switzerland

Application August 5, 1943, Serial No. 497,491
In Germany October 20, 1942

1 Claim. (Cl. 280—253)

This invention relates to pedal drives, and more particularly to pedal drives for cycles and the like and has for its object to provide an improved construction of the same which is particularly suitable for ladies' and children's bicycles, being inexpensive to manufacture, but of great strength and reliability in use and by which a less tiring motion of the feet is necessitated than when the foot-power is transmitted by the usual rotating pedal.

According to an important feature of the invention, the pedal drive comprises two to and fro moving levers arranged parallel to each other one at each side of a frame and swinging about a common geometric axis, each lever being provided at its free end with a pedal and with means for operating the axle to be driven and a compensating device being provided for compelling the levers to move in opposite directions.

Other objects and advantages of the invention will appear from the following description of the illustrated embodiment thereof in a well known form of bicycle disclosed in the accompanying drawing.

In the drawing, Fig. 1 is a side elevation of the bicycle;

Fig. 2 is a fragmentary rear elevational view partly in section and taken on line 2—2 of Fig. 1.

As shown in the drawing, the bicycle comprises a usual driving chain 1, which is driven by means of a main sprocket wheel 2 fixed on the main drive shaft 4 suitably mounted in tubular bearings extending through the frame 3. At both the ends of the shaft 4 there is mounted a secondary sprocket wheel 5, 5' which is provided with a latch device, not shown, of any approved construction, said latch device being so constructed that it will allow the axle to rotate only in clockwise direction.

At each side of the frame, there is arranged a lever 6, 6' provided at its free end with a pedal 7, 7'. Both the levers 6 and 6' are journalled on a common axle 17. Projections 8, 8' extend downwardly from the medial portions of the levers 6, 6' respectively and are positioned to describe arcs forwardly of the drive shaft 4.

An arm 14 extends downwardly and rearwardly at an inclination from the bearing located at the lower medial portion of the cycle frame while a third sprocket wheel 15 is rotatably mounted at the lower end thereof and arranged transversely of the cycle frame. A single driving chain member 16 is trained about the third sprocket wheel and thence about the secondary sprocket wheels 5 and 5' and has its ends connected to the outer ends of the projections 8, 8' so that it serves simultaneously as a driving member and as a compensating member and acts to compel the levers 6, 6' to move in opposite directions when downward movement is imparted to the pedals.

When the feet are placed on the pedals 7, 7' and moved in a downward direction, oscillating motion is alternatively imparted to the foot-levers 6 and 6' so that the driving chain member 16 alternately imparts rotary motion to the axle 4 through the pinions 5, 5'. By the pendulum motion of the foot-levers whose leverage is substantially less variable than with rotating pedals, the whole strength of the limbs can be applied along the whole downward stroke of the pedals, so that there is less fatigue than with the ankle movement required for operating rotating treadles.

It is to be understood that the stroke of the pedals may be easily changed at will during the drive.

What I claim is:

A pedal drive for cycles in which the frame is of a conventional type comprising a main drive shaft journalled in the lower medial portion of the frame, a main sprocket wheel carried thereby and in driving connection with the rear wheel of the cycle, secondary sprocket wheels on opposite sides of the frame and in clutch connection with the drive shaft so as to rotate the drive shaft only in clockwise direction, a pair of levers arranged on opposite sides of the frame and having their inner ends pivotally connected to the lower side bars of the cycle frame, projections extending downwardly from the medial portions of the levers and positioned to describe arcs forwardly of the drive shaft, an arm extending downwardly and rearwardly inclined from the lower medial portion of the cycle frame, a third sprocket wheel rotatably mounted at the lower end of the arm and arranged transversely of the cycle frame, and a chain member trained about the third sprocket wheel and thence about the secondary sprocket wheels and having its ends connected to the outer ends of the projections for compelling the levers to move in opposite direction when downward movement is imparted to the pedals.

JACQUES WASEM.